(12) United States Patent
Weber

(10) Patent No.: US 7,964,834 B2
(45) Date of Patent: Jun. 21, 2011

(54) LOW BACKSCATTER TEST METHOD AND APPARATUS

(75) Inventor: Jonathan L Weber, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 292 days.

(21) Appl. No.: 12/432,806

(22) Filed: Apr. 30, 2009

(65) Prior Publication Data

US 2010/0276569 A1 Nov. 4, 2010

(51) Int. Cl.
*G01C 21/02* (2006.01)
(52) U.S. Cl. .................. 250/203.1; 250/208.1
(58) Field of Classification Search .......... 250/203.1, 250/203.6, 208.1, 347, 348, 352, 353; 356/4.01–5.01, 28, 139.08, 141.3, 153; 398/152–159, 172, 121, 122
See application file for complete search history.

(56) References Cited

U.S. PATENT DOCUMENTS 6,763,196 B2 * 7/2004 Yafuso .................. 398/156
* cited by examiner

*Primary Examiner* — Que T Le
(74) *Attorney, Agent, or Firm* — Vern Maine & Associates

(57) ABSTRACT

A compact instrument enables placement of the instrument such that the image of the laser beam, as retro reflected and diffracted, forms outside the tracking field of view. The target source and beam camera can be located at the focus of a Cassegrain objective. Embodiments include shared objective and twin objective design. With a shared objective design, both the beam projector and profiling camera can see the same focal length. A two objective design can use two different focal lengths.

20 Claims, 13 Drawing Sheets

800

900

1000

1200

LOW BACKSCATTER TEST METHOD AND APPARATUS

STATEMENT OF GOVERNMENT INTEREST

This invention was made with United States Government support under Contract No. HSSCHQ-04-C-00342 awarded by the Department of Homeland Security. The United States Government has certain rights in this invention.

FIELD OF THE INVENTION

The present invention relates to improved measurement of bore sight error in directed energy systems by reducing backscatter induced "self tracking." A compact instrument enables placement of the instrument such that the image of the laser beam, as retro reflected, scattered and diffracted, forms outside the tracking field of view avoiding self tracking errors.

BACKGROUND OF THE INVENTION

Laser/infrared tracking systems exist for both air and land-based applications. One application is a counter measure to man-portable air-defense systems (MANPADS), small anti aircraft missiles. These countermeasure systems operate with tight tolerances that are difficult to achieve. For example, bore sight alignment is a demanding issue. Typically, bore sight measurements require accuracy of the order of 10 μrad. This is difficult to measure without interference from artifacts. It is also difficult to maintain, so these measurements should be made frequently.

Retro reflection is also a particularly important issue. The jam laser is typically very powerful and the tracker very sensitive. If the tracker sees even a small fraction of the retro reflected jam laser from the measurement apparatus, it may begin to track that instead of the reference target, a phenomenon called "self tracking." Retro reflection from most devices and surfaces used in beam profile and measurement cameras is typically several orders of magnitude larger than the limits for the onset of this effect for most trackers. Practical experience has shown that elimination of this artifact is difficult both to achieve and to verify.

Measurement of the pointing of a beam directed under control of a tracker requires an instrument that both locates the beam in angular space and isolates it from the tracker providing the pointing, unless closed loop tracking (around the backscattered beam) is the intent.

Test devices have generally been ad-hoc devices built without an understanding of back scatter and how to suppress it. Backscatter contaminates pointing device management and can require unrealistic input signals for tracking (i.e. increasing it enough to overwhelm the backscatter component). These Ad hoc methods are unreliable and involve high maintenance.

FIG. 1 shows a prior art configuration 100 of the standard method to provide bore sight alignment between the outgoing target beam and the incoming directed beam by replacing unit under test (UUT) 105 with corner cube 110. Corner cubes of appropriate size and precision are commercially available. The problem is that beam camera 115 is so insensitive (because it must survive and measure a high power laser) that it is difficult to get sufficient beam power from a black body source 120. The source 120 is usually operated at much higher power levels than required for tracking by UUT 105.

The alternative, often used, is to add a reference laser beam to augment the black body tracker output. While this is useful it too is susceptible to misalignment, adding to the overall complexity. With a compact pointing instrument, the mount is smaller and more rigid making reference lasers less prone to lose alignment themselves. Typically, a reference laser is used to get near alignment and use the black body for a final measurement, either to achieve final alignment or to measure the residual error.

FIG. 2 further depicts a prior art configuration 200 for the problem of testing and pointing a directable beam pointing device. The unit under test is jammer 205 comprising tracker 210 and jam beam source 215. Tracker 210 uses a target beam generated at source 220 and collimated by lens 225 to point jam head 205. The camera comprising lens 230 and focal plane array package 235 measures the centroid and profile of the beam. The objective is to measure the departure from anti parallel of arrows 240 and 245. The problems in making this measurement are: 1) Adjusting and maintaining calibration of the alignment of the camera 235 and target beam and 2) Retro reflections such as indicated by arrow 250. FIG. 2 shows the retro reflection path as the dashed arrow 250.

Laser retro reflection is assumed to be a spherical wave front leaving the measurement camera. When it returns to the lens used by the beam analysis camera, it is collimated and sent back towards the UUT where it can enter its tracker aperture and be imaged in competition with the black body produced target.

What is needed is a test method and device that is simple to build, rugged, reliable and has backscatter reliably reduced to prevent self tracking. Such a device can be used for lab testing, alignment check prior to range testing, flight line testing of installed jammers, and calibration of all multi aperture directable jammers.

SUMMARY OF THE INVENTION

Embodiments solve the problems shown in FIG. 2 by addressing the ways that retro reflection can reach the tracker aperture and suppressing them. Elements include: 1) placing the test instrument within critical ranges of the unit under test and 2) minimizing or eliminating the use of beam splitters.

Embodiments include two approaches for controlling problems indicated in FIG. 2: 1) using a shared objective system to reduce the alignment sensitivity to deflection, shown in FIGS. 3 and 4; and 2) making a two objective system small to reduce the bending moments, as shown in FIG. 10. Shared objective systems have the advantages of simpler alignment and maintenance of bore sight. A shared objective embodiment has the added benefit that it can test a jammer in any orientation by use of an annular mirror to split the incoming laser beam from the outgoing target beam as shown in FIGS. 3 and 4. Paired module systems can use smaller active objectives allowing smaller instruments with cost savings that can offset the higher cost of maintaining two instruments in alignment.

Invention embodiments provide a compact instrument that enables placement of the instrument such that the image of the laser beam, as retro reflected, scattered and diffracted, forms outside the tracking field of view. This geometry also enables the placement of a baffle to block this radiation without losing the target beam.

In a shared objective embodiment as shown in FIG. 4, the target source and beam profile and location camera are located at the focus of an off-axis Cassegrain objective. A two objective embodiment can use two different focal lengths.

Target power, as projected from the black body source, decreases as the square with objective focal length. The target beam is near parallel as it leaves the objective. Thus, the requirement for the objective aperture to fill the tracker window is that the width of the outer annulus equals the tracker aperture diameter plus whatever distance it moves under tests such as vibration. Beam position resolution improves with test objective focal length. Thus, the objective focal length is a compromise between obtaining sufficient beam location resolution and target irradiance at the UUT tracker aperture.

Embodiments include a low-backscatter test method comprising providing a test instrumentation configuration comprising a tracking target; forming an image of a jam laser; mapping far field of the jam laser image; and locating the jam laser image, wherein the image as retro reflected, scattered and diffracted forms outside tracking field of view, avoiding self tracking errors. In another embodiment, the test instrumentation configuration is a Cassegrain test instrumentation configuration. In yet another embodiment, the Cassegrain test instrumentation configuration comprises a shared objective. For other embodiments, the Cassegrain test instrumentation configuration comprises two objective pointing measurement instruments, and the test instrumentation configuration comprises an annular mirror.

Other embodiments include a low-backscatter unit under test (UUT) instrumentation apparatus comprising at least one mirror reflecting a laser source; and a camera receiving radiation from the laser source, whereby an image is formed wherein the image as retro reflected, scattered and diffracted forms outside tracking field of view. Yet other embodiments comprise a Cassegrain configuration, a shared objective, and two objective pointing measurement instruments. For other embodiments, the Cassegrain configuration provides a frontal aperture thereby reducing instrument size and facilitating construction and alignment. Other embodiments comprise an annular mirror. While for yet others, the annular mirror separates incoming and outgoing beams. In an embodiment, the annular mirror enables elimination of beam splitters and their scatter. For yet other embodiments, the UUT comprises a beam pointing device. In others, the beam pointing device comprises a jammer. Another embodiment comprises an outer mirror and an internal mask, whereby substantially all of the outer mirror blocks direct transmission of retro reflected jammer laser to UUT tracker. Yet other embodiments comprise a compact layout, dust resistant package whereby near field retro-reflection is suppressed and whereby mirror cleanliness is maintained. In another embodiment, high resolution at full aperture is required only near center of field and only to diffraction limit of central aperture as defined by the annular mirror, thereby relaxing tolerances. For another embodiment, smaller apertures provide shorter design dimensions thereby relaxing tolerances and increasing rigidity, supporting units under test (UUTs) in all rotation orientations.

Yet another embodiment is a low-backscatter unit under test (UUT) instrumentation apparatus comprising at least one mirror, the at least one mirror comprising an off-axis Cassegrain mirror and at least one annular mirror, wherein the center of the annulus of the at least one annular mirror is offset with respect to the tracking aperture of the UUT; and a laser source reflected by the at least one mirror, whereby an image is formed wherein the image as retro reflected, scattered and diffracted forms outside the tracking field of view of tracker of the UUT.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
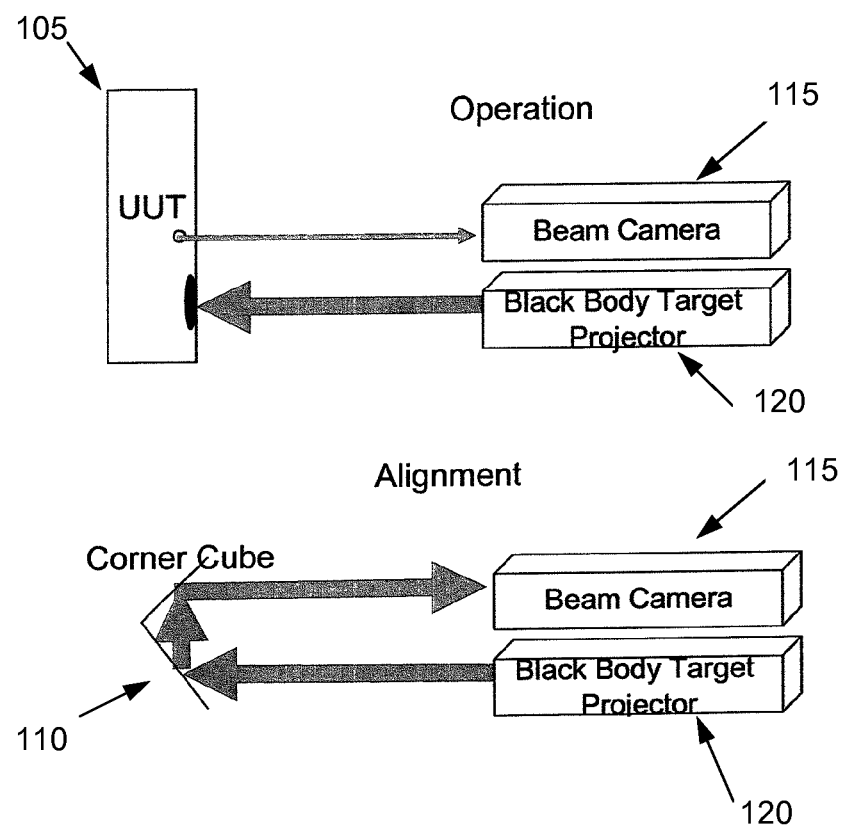
FIG. 1 is a diagram depicting operation and alignment modes showing use of a corner cube for testing a directable beam pointing device (prior art).
Figure 2:
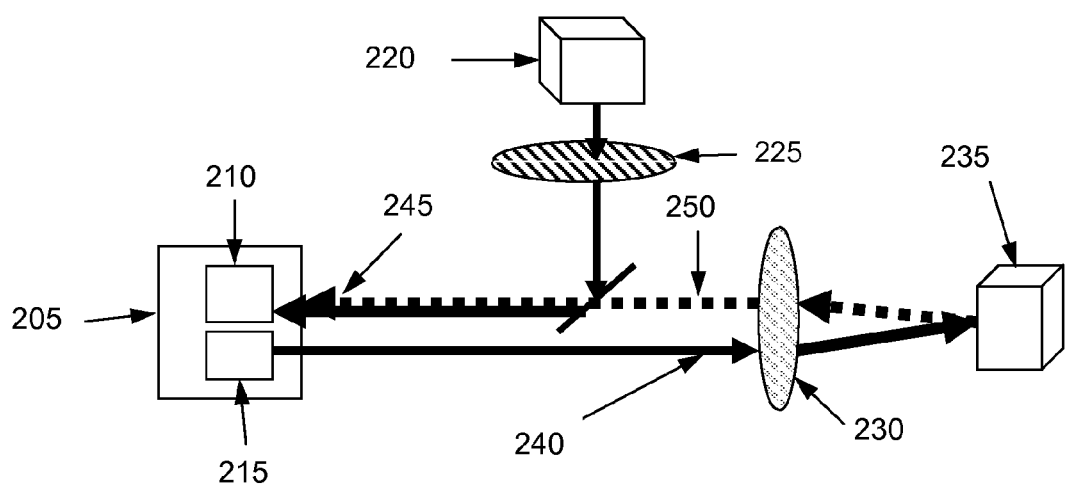
FIG. 2 is a diagram depicting testing and pointing a directable beam pointing device (prior art).
Figure 3:
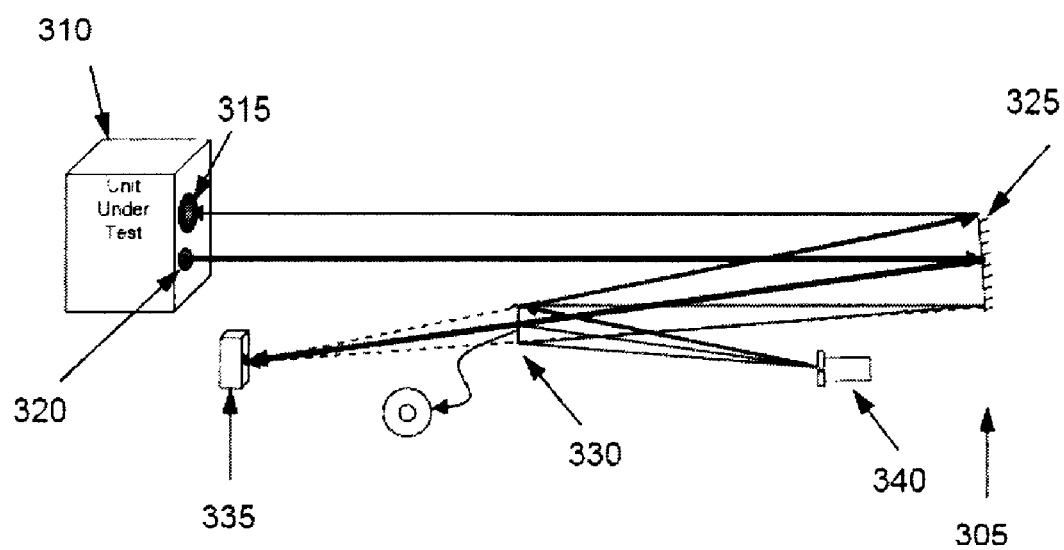
FIG. 3 is a diagram depicting a shared objective pointing instrument implemented on an optical bench configured in accordance with an embodiment.

FIG. 3 shows a shared objective bore sight error measurement instrument embodiment 300 implemented on optical bench 305. Unit under test 310 has tracker 315 and laser output 320. Off-axis paraboloid mirror 325 focuses the laser radiation beam profile that goes through the central hole of annular mirror 330 on centroid camera 335. Tracker 315 locks on the target beam from source 340 which is collimated by paraboloid 325 via annular mirror 330.

This embodiment is used for pointing error (i.e. bore sight error) measurements and illustrates the shared objective approach with the elimination of refractive and pellicle beam splitters. This embodiment includes use of the annular mirror 330 in an off-axis optical system (by virtue of off-axis paraboloid 325). Annular mirror 330 is also shown in inset elevation. With the output laser projected down the center, UUT 310 can be tested in any orientation. Annular splitting mirror 330 performs the additional function of restricting back scatter from the camera focal plane to the center of the objective. The tracker of UUT 310 is located to collect radiation only from the outer part of the objective aperture. Thus, annular mirror 330 achieves a geometrical optical separation of the target beam from the returning retro-reflected UUT laser beam. Diffraction analysis shows that this separation is not always sufficient but this double use of the annular mirror contributes to this invention.

The use of a single mirror in this configuration and installation on an optical table prevents the instrument from being close to the unit under test. The mirror has a back focus equal to its focal length and back focal space is used for the target source and camera elements. The limited off-axis distance of the paraboloid keeps the UUT out of this area.

Figure 4:
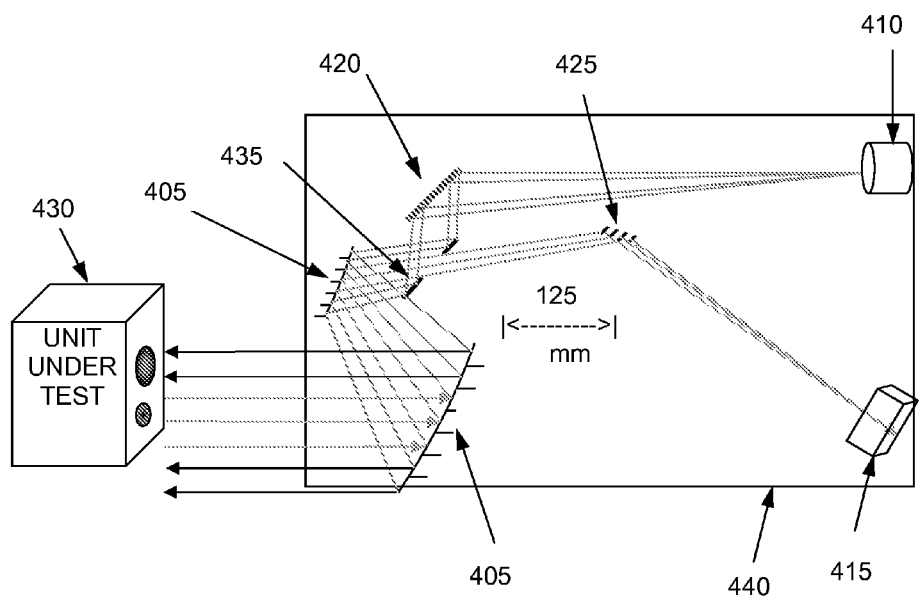
FIG. 4 is a diagram showing a compact shared objective collimator configured in accordance with an embodiment.

FIG. 4 depicts a compact shared objective collimator embodiment 400. Replacing the single off axis paraboloid 325 of FIG. 3 with an off-axis Cassegrain objective 405 moves the entrance/exit aperture to the front of the instrument and reduces the distance to the focus points for the source 410 and camera 415. Fold mirrors 420 and 425 are optional and are sized and placed to locate beam camera 415 and target source 410 at convenient places on a compact mounting plate. This arrangement allows UUT 430 to be close to the measurement instrument. The design minimizes the distances from annular mirror 435 aperture to Cassegrain mirrors 405 and from these mirrors to UUT 430. The design enables placement of annular mirror 435 as close a possible to the objective combination to minimize distances from the aperture and maximize the physical diameter of the aperture. For embodiments, optical bench 440 dimensions may be approximately 15 by 24 inches.

Figure 5:
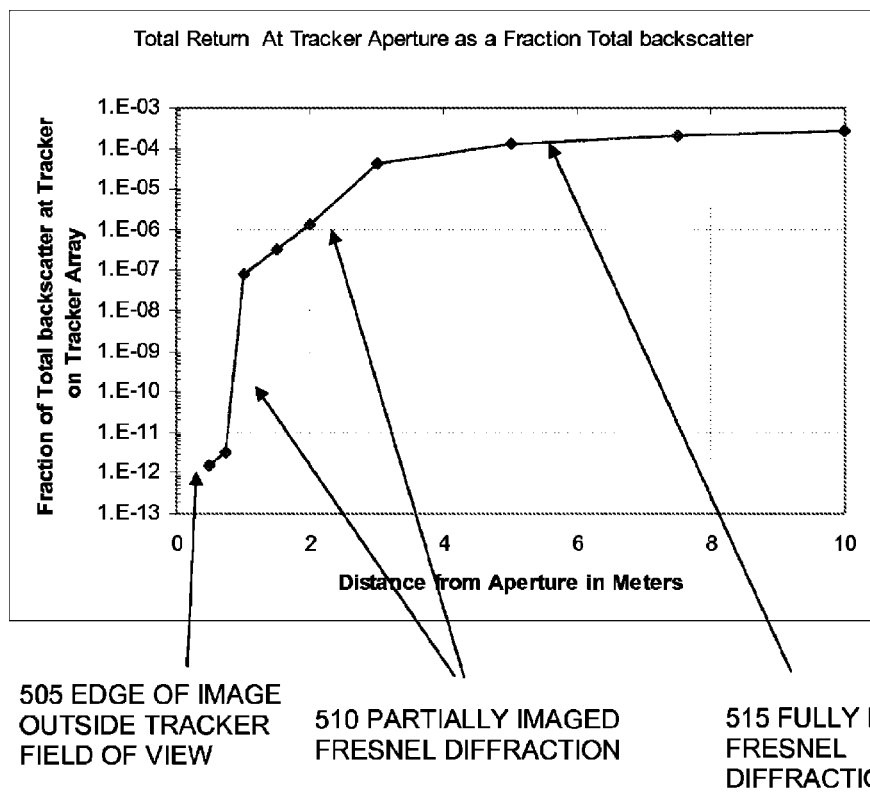
FIG. 5 is a graph showing a plot of typical retro reflective back scatter versus distance from the Cassegrain primary mirror configured in accordance with an embodiment.

FIG. 5 shows a typical plot 500 of retro reflective back scatter versus distance from the Cassegrain primary mirror (lower right of the two mirrors, 405 in FIG. 4). Regions depicted are the edge of image outside tracker field of view 505, partially imaged Fresnel diffraction 510, and fully imaged Fresnel diffraction region 515. The breakpoints on this plot depend on: 1) The size of the tracker aperture; 2) The separation between the laser and tracker aperture; 3) The size of the hole in the annular mirror; and 4) The images size and angular coverage of the tracker focal plane. For typical infrared wavelengths, apertures and distances, the propagation of the laser from the annular mirror aperture is well approximated as Fresnel diffraction.

The Huygens Fresnel integral describes the diffraction of the beam for purposes of estimating its profile. The Huygens Fresnel theory is that the central portion of the beam is little affected by the confining aperture in the annular mirror, but the outer portions of the beam behave as though they were originating at the edge. This portion of the beam approximates a spherical wave originating at the edge of the aperture. The Huygens Fresnel integral is widely accepted as the method of calculating the contributions from the entire aperture at any point beyond the aperture.

Figure 8:
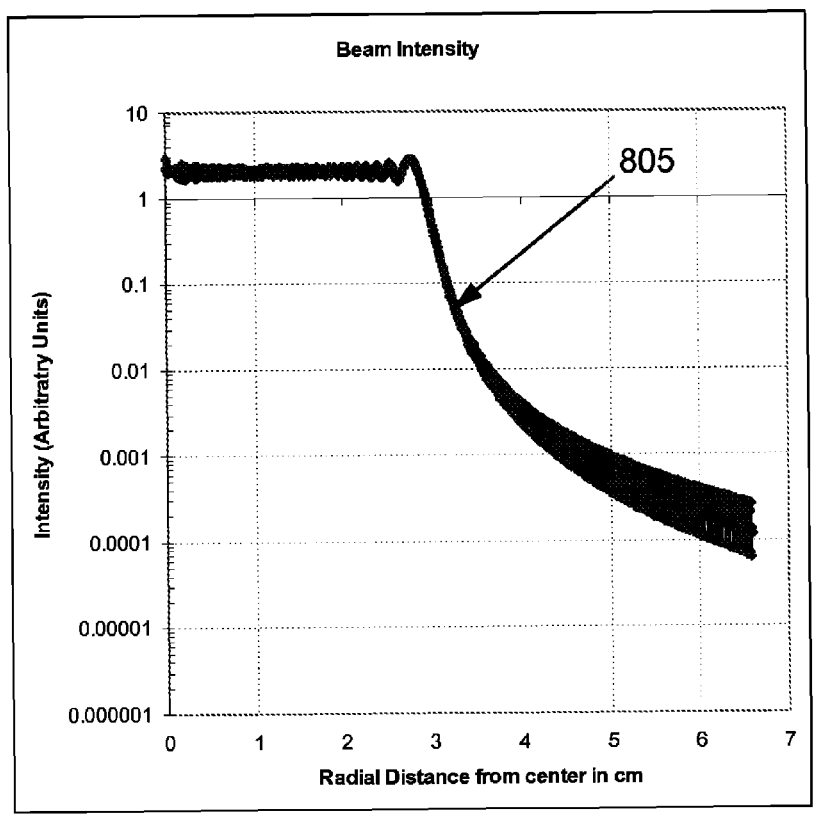
FIG. 8 is a graph showing typical high Fresnel diffraction for a 3 cm radius aperture as configured in accordance with an embodiment.

FIG. 8 is typical result of such a calculation of beam intensity versus distance from the center for a 3 cm aperture at about the distance from the annular aperture in mirror 435 of FIG. 4.

The annular aperture is in the beam as it expands as a near spherical wave from the measurement camera focus. When this beam reaches the outer mirror of the objective, the core becomes a virtual plane wave propagating along the center of the aperture and well clear of the UUT tracker when near enough that it has not spread due to unavoidable beam divergence. This is the view of a collimator.

Figure 7:
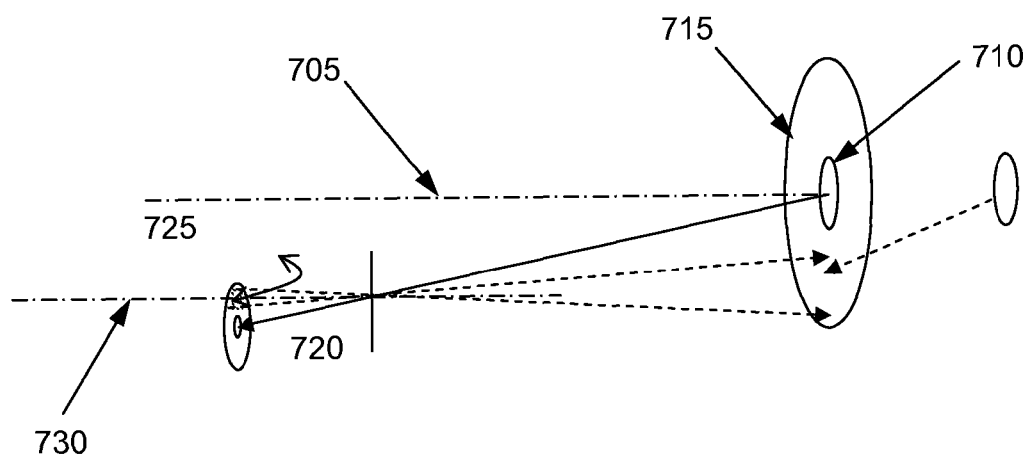
FIG. 7 is a diagram depicting how the Fringe pattern falls on the tracker focal plane as configured in accordance with an embodiment.
Figure 11:
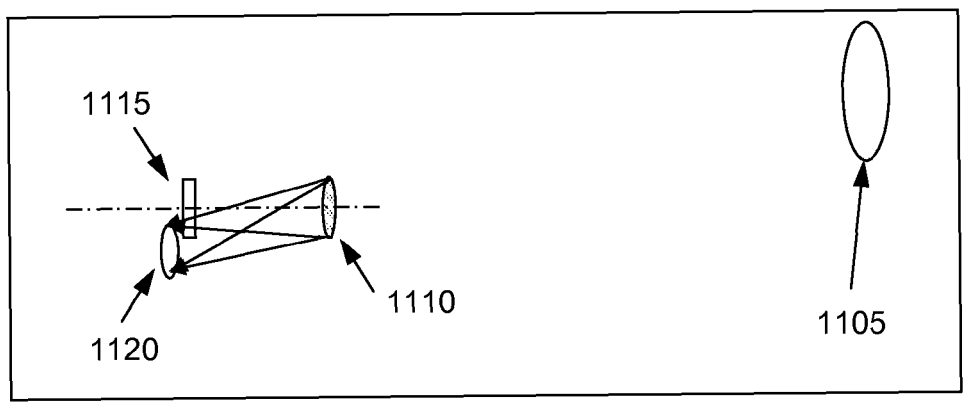
FIG. 11 is a diagram showing the partial image geometry as configured in accordance with an embodiment.
Figure 12:
FIG. 12 is a diagram showing the full image forming case as configured in accordance with an embodiment.

The backscatter at the tracker aperture is estimated by evaluating the Huygens Fresnel integral over the tracker aperture. This estimates the fraction of the beam getting to the tracker. If geometric analysis shows that an image of the inner annular mirror aperture is imaged in the UUT track window, it has a direct line of sight to the backscatter beam. Virtually all of the power at the tracker aperture forms an image of the backscatter UUT laser beam. If this image forms outside the UUT tracker window, it has no such line of sight and all it "sees" is scatter of the "fringe" radiation that diffracted from the core to the outer part of the objective. For intermediate cases, the amount of back scatter reaching the tracker window is approximately proportional to the fraction of the inner aperture it "sees". FIG. 7 shows the case of the core missing the window; FIG. 11 shows the intermediate case, and FIG. 12 shows the worst case.

Figure 6A:
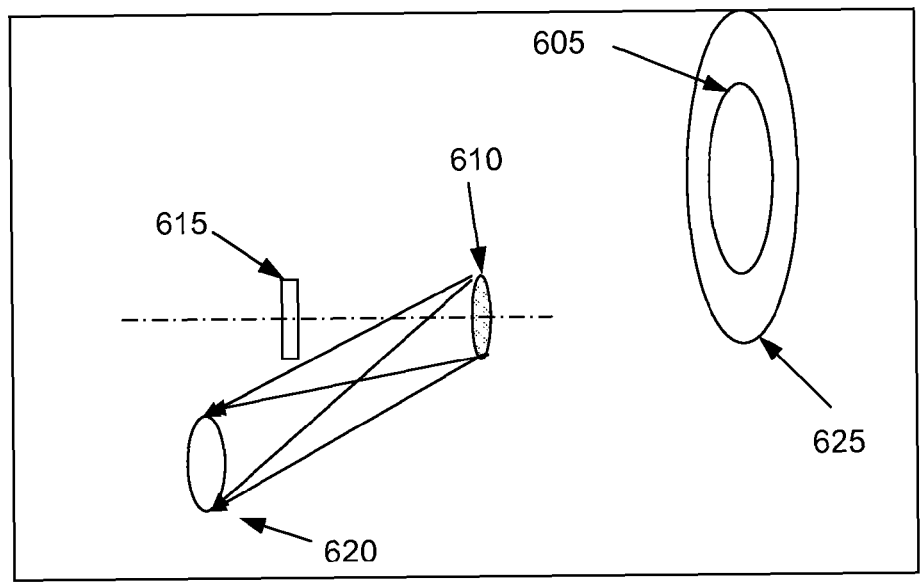
FIG. 6A is a diagram showing this image in the regions shown in the scattered Fresnel fringe diffraction range as configured in accordance with an embodiment.

FIG. 6A shows a diagram 600 for this power distribution at the output aperture of the measurement objective. The laser illumination in the mirror aperture as projected by the Cassegrain objective has a main beam or core 605. Core region 605 is of the backscattered laser beam propagating as a near plane wave. UUT tracker objective 610, represented as a simple convex element, is placed to "see" the target beam from the black body source and place it in a central region of the tracker focal plane 615; usually a two dimensional detector array. The tracker lens also "sees" backscattered jam laser radiation shown as a core region 605 and a fringe 625. Fringe 625 is part of backscattered laser beam due to BRDF from the collimating objective. In this case, the image of 605 forms at 620, by 610—well away from the tracker focal region comprising either part of the focal plane 615 or the whole of it. In this case, no direct line of sight exists for the laser beam to reach tracker focal plane 615, but some fringe radiation does reach it.

Figure 6B:
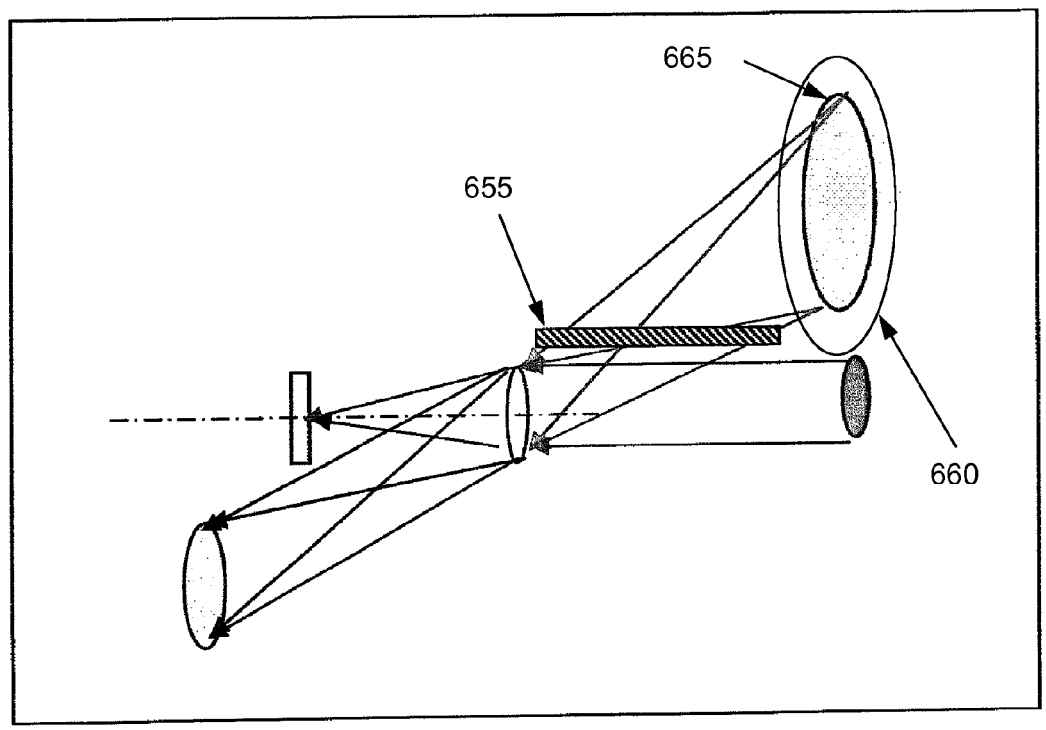
FIG. 6B is a diagram depicting a baffle blocking radiation for objects outside field of view without loss of target beam configured in accordance with an embodiment.

Inside this fringe critical range, the tracker forms a large image of 605 far enough below the focal plane that no rays forming the image intersect the tracker focal plane. Many trackers accept track images only inside a small subset of the array which has the result of increasing the allowable separation between the UUT and the test instrument. The effects of radiation scattered inside the tracker camera assembly are not included in the analysis of this embodiment. Because this image is formed off the array, it is possible to block it by means of a baffle without compromising the integrity of the projected target image if this is necessary. FIG. 6B depicts a baffle. For typical dimensions of UUTs and instruments, this condition holds to a distance of about 1 meter.

For the shared objective configuration, the laser aperture (the hole in the annular mirror) is inside the instrument. This produces a near spherical wave Fresnel diffraction pattern as previously described. As also previously described, the outer fringe radiation is scattered by the mirror as described by the Bi-Directional Reflection Distribution Function (BRDF) and imaged on the tracker focal plane. Because it has no direct path the UUT tracker aperture, it will appear to originate from this surface. For this geometry and a moderately clean mirror, this produces a total back scatter power in the $10^{-12}$ range. Since this is well inside the hyper focal distance of most trackers, this image is a moderately shaded (most intense at the top in this case) largely featureless blob. If this covers an n-by-m array, each pixel will see a radiation level of about $10^{-12}/(n\text{-by-}m)$ of the total back scatter power.

FIG. 6B, diagram 650, illustrates the point that this geometry also enables the placement of baffle 655 to block the much more intense core radiation without losing the target beam. FIG. 6B shows the target beam. Such a baffle is would be useful if the UUT tracker design allowed significant internal scatter for some of this power to reach its tracking window region. Baffle 655 cannot block fringe radiation 660 although it is much less intense than beam core 665. A two objective instrument does not have this fringe retro reflected input, but its main or core beam is still diffracted and may produce small artifacts.

FIG. 7 depicts diagram 700 of how the fringe pattern falls on the tracker focal plane. The main part of the laser retro reflection from the aperture propagates along the center line 705 from 710. The fringe pattern from the internal aperture extends over the entire output mirror as shown schematically 715. Tracker objective 720, shown in this case by its unit plane, images the entire laser pattern comprising the core and fringe regions over a large area including tracker focal plane detector array 725. Because core center line 705 is well enough separated, none if its image falls in 725. Its centerline 730 projects back to the fringe region as indicated by the usual unit plane diagram. The core image center is located as shown by the arrow from its center projected through the unit plane the small circle below 720.

FIG. 8 is a graph 800 depicting the approximate pattern 805 at the output mirror for monochromatic radiation. The slight maximum at zero is a well known feature of Fresnel diffraction from a circular aperture. The graph shows typical high Fresnel diffraction for a 3 cm radius aperture.

Figure 9:
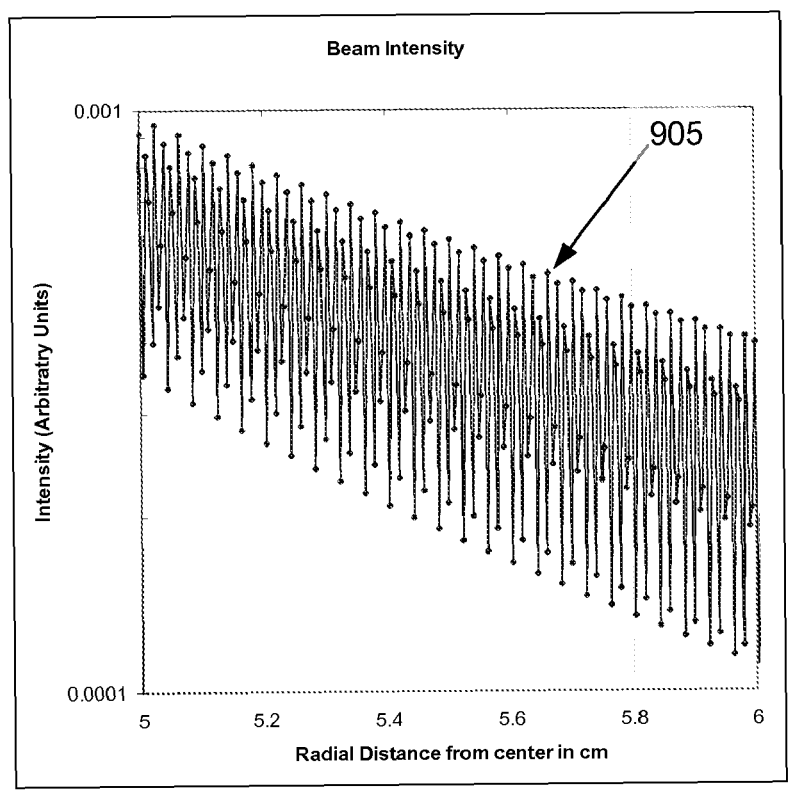
FIG. 9 is a graph showing the fringe region in more detail.

FIG. 9 is a graph 900 depicting the fringe region in more detail. The radiation from these fringes does not directly propagate toward the tracker. FIG. 7 shows the physical aperture in relation to the output mirror with the arrow showing the direction of primary propagation.

The radiation reaches the tracker aperture by scattering as described by the BiDirectional Reflectance Distribution Function (BRDF) of the mirrors. Direct reflection does not occur because this fringe radiation reaches the objective by effectively being diffracted out of a straight line from the profiler focal plane. Because radiation, after diffraction, propagates in a straight line, this fringe radiation is reflected away from the tracker. Only the indirect scatter as described by BRDF formalism can get to the UUT tracker aperture. BRDF depends on the cleanliness of the surface. Thus, a dust resistant enclosure suppresses backscatter. At distances where only the fringes are imaged, the tracker is usually far too close to focus these fringes well enough to resolve them. A two objective instrument can have the entrance and exit aperture external and therefore be virtually free of the fringing background. As with the shared objective approach, a Cassegrain objective allows a frontal aperture and reduces the overall size of the instruments, assisting in limiting area for dust accumulation.

Figure 10:
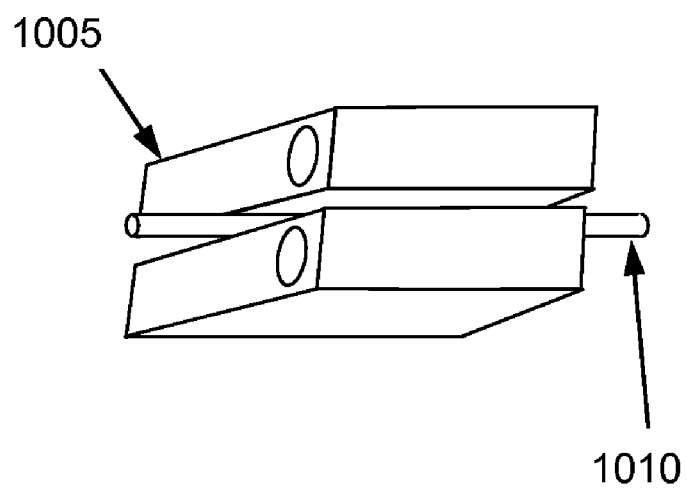
FIG. 10 is a diagram showing a two objective instrument configured in accordance with an embodiment.

FIG. 10 is a diagram 1000 depicting a two objective instrument 1005. This design allows a smaller aperture, but usually will include a pivot shown schematically as rod 1010. As this assembly rotates to align with the centers of the apertures on the UUT, it will be stressed and should be rigid enough to maintain alignment if it is to be useful in aligning instruments in various orientations.

FIG. 11 is a diagram 1100 depicting the partial image geometry. In this context, when part of the image of the inner aperture falls on the focal plane, a direct line of sight exists between the BRDF from the profile camera and the UUT tracker focal region. At this separation of the instrument objective, from 1105, tracker objective 1110, image 1120 of the instrument aperture is only partially on focal plane 1115 of the tracker. This image is usually far out of focus and may be rejected by tracker software. It may also be outside the tracking zone of the focal plane. This separation is typically well in the Fresnel diffraction regime. The Fresnel number $F_n$ is:

$$Fn = r^2/\lambda z$$

Where r is the aperture radius; $\lambda$ is the wavelength; and z is the distance from the aperture. For a 25 mm aperture and 5 μm wavelength radiation, the Fresnel number at 0.75 meters is about 167. The more readily computed Fraunhofer diffraction approximation is valid when $F_n$ is less than 1 (typically at a range of over 100 meters). The Huygens Fresnel integral predicts the total power that falls in the image with virtually all of it forming the core image. This amount of this that reaches the tracker focal plane array scales approximately as the ratio of the area on the array to the total area of this image. Adding filters and beam splitters adds scattering surfaces which can add additional diffuse "ghost images. For the geometry evaluated, this regime extends from 0.75 to about 3 meters. This geometry corresponds roughly to an instrument of the approximate dimensions of the embodiment in FIG. 4.

FIG. 12 is a diagram 1200 depicting the full image forming case. At sufficient separation, the diffracted power forms an image 1205 of the output aperture that fits on the tracker focal plane and may be small enough to be confused with a target. In this context, formation of an image of the aperture at the focal plane means the existence of a direct line of sight from the BRDF scattering off the profile camera focal plane to the tracker image plane gate. This image can form even when geometrical optics shows that no laser power can reach the tracker. Fresnel diffraction provides the power. The backscatter is much larger than the other two cases, so, as before, the fringe power is negligible. Typical instruments built on optical tables are well inside this regime. The embodiment of FIG. 3 operates at about 5 meters. Its geometry is somewhat different from the examples used to compute the curve of FIG. 5, but its backscatter follows the same pattern but with longer minimum distances.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A low-backscatter test method comprising:
   providing a test instrumentation configuration comprising a tracking target;
   forming an image of a jam laser;
   mapping far field of said jam laser image; and
   locating said jam laser image, wherein said image as retro reflected, scattered and diffracted forms outside tracking field of view, avoiding self tracking errors.

2. The method of claim 1, wherein said test instrumentation configuration is a Cassegrain test instrumentation configuration.

3. The method of claim 2, wherein said Cassegrain test instrumentation configuration comprises a shared objective.

4. The method of claim 2, wherein said Cassegrain test instrumentation configuration comprises two objective pointing measurement instruments.

5. The method of claim 1, wherein said test instrumentation configuration comprises an annular mirror.

6. A low-backscatter unit under test (UUT) instrumentation apparatus comprising:
   at least one mirror reflecting a laser source; and
   a camera receiving radiation from said laser source, whereby an image is formed wherein said image as retro reflected, scattered and diffracted forms outside tracking field of view.

7. The apparatus of claim 6, comprising a Cassegrain configuration.

8. The apparatus of claim 7, comprising a shared objective.

9. The apparatus of claim 7, comprising two objective pointing measurement instruments.

10. The apparatus of claim 7, wherein said Cassegrain configuration provides a frontal aperture thereby reducing instrument size and facilitating construction and alignment.

11. The apparatus of claim 6, comprising an annular mirror.

12. The apparatus of claim 11, whereby said annular mirror separates incoming and outgoing beams.

13. The apparatus of claim 12, wherein said annular mirror enables elimination of beam splitters and their scatter.

14. The apparatus of claim 6 wherein said UUT comprises a beam pointing device.

15. The apparatus of claim 6, wherein said beam pointing device comprises a jammer.

16. The apparatus of claim 11, comprising an outer mirror and an internal mask, whereby substantially all of said outer mirror blocks direct transmission of retro reflected jammer laser to UUT tracker.

17. The apparatus of claim 8, comprising a compact layout, dust resistant package whereby near field retro-reflection is suppressed and whereby mirror cleanliness is maintained.

18. The apparatus of claim 11, wherein high resolution at full aperture is required only near center of field and only to diffraction limit of central aperture as defined by said annular mirror, thereby relaxing tolerances.

19. The apparatus of claim 9, wherein smaller apertures provide shorter design dimensions thereby relaxing tolerances and increasing rigidity, supporting units under test (UUTs) in all rotation orientations.

20. A low-backscatter unit under test (UUT) instrumentation apparatus comprising:
- at least one mirror, said at least one mirror comprising an off-axis Cassegrain mirror and at least one annular mirror, wherein the center of the annulus of said at least one annular mirror is offset with respect to tracking aperture of said UUT; and
- a laser source reflected by said at least one mirror, whereby an image is formed wherein said image as retro reflected, scattered and diffracted forms outside tracking field of view of tracker of said UUT.

* * * * *